United States Patent [19]

Moosmann et al.

[11] E Patent Number: Re. 33,167

[45] Reissued Date of Patent: Feb. 20, 1990

[54] CIRCUIT ARRANGEMENT FOR MONITORING SPEED OF A DRIVE MOTOR

[75] Inventors: Helmut Moosmann, Villingen-Schwenningen; Rolf Müller, St. Georgen, both of Fed. Rep. of Germany

[73] Assignee: Papst-Motoren GmbH & Co. KG, St. Georgen, Fed. Rep. of Germany

[21] Appl. No.: 101,581

[22] Filed: Sep. 28, 1987

Related U.S. Patent Documents

Reissue of:

[64] Patent No.: 4,544,852
Issued: Oct. 1, 1985
Appl. No.: 410,969
Filed: Aug. 24, 1982

[30] Foreign Application Priority Data

Aug. 26, 1981 [DE] Fed. Rep. of Germany ..... 3133725
Apr. 29, 1982 [DE] Fed. Rep. of Germany ..... 3216001

[51] Int. Cl.[4] ..... G01R 23/09; G01R 23/15

[52] U.S. Cl. ..... 307/519; 307/351; 307/363; 307/261; 328/35; 328/129.1; 328/140; 388/909; 388/800

[58] Field of Search ..... 307/510, 517, 519, 351, 307/354, 362, 363, 261, 272 R, 590–592, 308–309; 328/35, 67, 128, 129.1, 140; 310/68 E, 111, 155; 318/326, 327

[56] References Cited

U.S. PATENT DOCUMENTS

| | | | |
|---|---|---|---|
| 3,838,341 | 9/1974 | Gaines | 307/517 X |
| 3,940,660 | 2/1976 | Edwards | 307/592 X |
| 4,011,491 | 3/1977 | Grover et al. | 318/327 |
| 4,082,968 | 4/1978 | Jones | 318/326 X |
| 4,107,561 | 8/1978 | Schmidt | 310/111 X |
| 4,117,384 | 9/1978 | Armstrong | 318/326 |
| 4,121,141 | 10/1978 | Frazee | 318/326 |
| 4,286,199 | 8/1981 | Nagakubo et al. | 318/327 |
| 4,446,439 | 5/1984 | Mizumoto et al. | 307/519 X |
| 4,449,082 | 5/1984 | Webster | 318/326 |

*Primary Examiner*—David Hudspeth
*Attorney, Agent, or Firm*—Fitch, Even, Tabin & Flannery

[57] ABSTRACT

A circuit for speed monitoring, particularly for fan drives. A detection device for producing an input signal sequence is provided which has a speed-dependent repetition frequency. The circuit also has a signal converter for converting the input signal sequence into an output signal whose amplitude is a function of the repetition frequency of the input signal sequence. There is also an evaluation circuit, having at least one threshold value element responsive to the output signal of the signal converter and which responds if the output signal amplitude reaches a value corresponding to a drop below a predetermined minimum speed or a rise above a predetermined maximum speed.

34 Claims, 7 Drawing Sheets

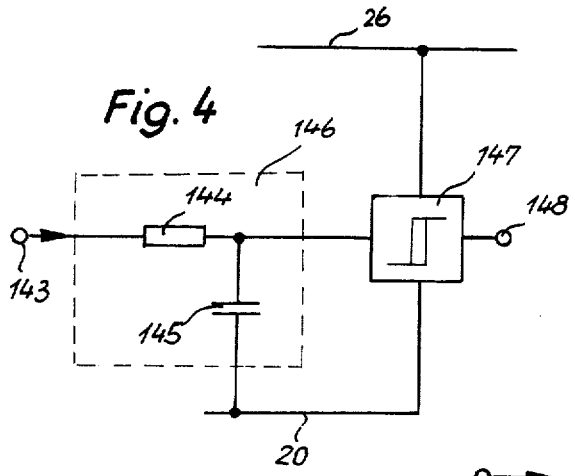
Fig. 4
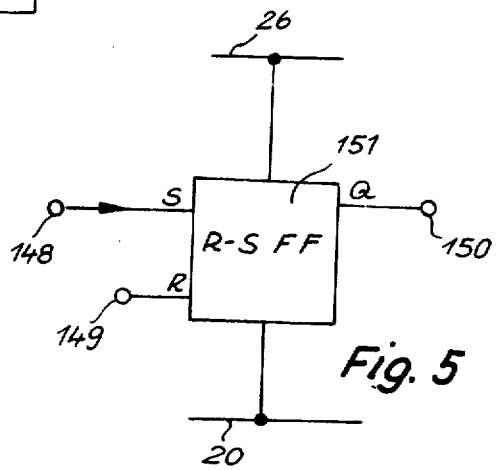
Fig. 5
Fig. 6
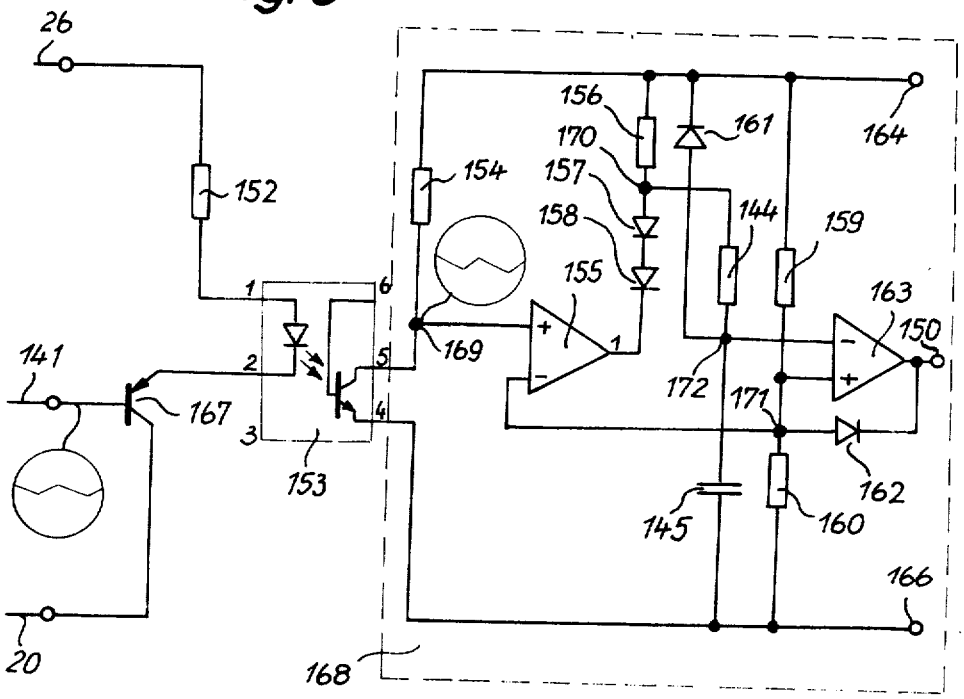

CIRCUIT ARRANGEMENT FOR MONITORING SPEED OF A DRIVE MOTOR

Matter enclosed in heavy brackets [ ] appears in the original patent but forms no part of this reissue specification; matter printed in italics indicates the additions made by reissue.

BACKGROUND OF THE INVENTION

The invention relates to a circuit arrangement for monitoring speed, particularly for fan drives.

Such speed monitoring circuit arrangements are, for example, used in conjunction with fans for cooling electronic computers or other temperature sensitive assemblies. They serve to initiate alarm or switching operations, or both, when the fan stops or the fan speed drops below a predetermined minimum value in order to prevent damage to the assembly to be cooled. In uses of this type, fan failure can lead to significant damage. Therefore, great practical significance is attached to the reliable detection of fan malfunctioning. In other situations, it can be important to reliably determine and indicate that a predetermined maximum speed has been exceeded.

BRIEF SUMMARY OF THE INVENTION

The problem of the invention is to provide a circuit arrangement for speed monitoring purposes, which is relatively simply constructed and which has a high operational reliability.

The problem of the present invention is solved by a detection device for producing an input signal sequence having a speed-dependent repetition frequency, a signal converter for converting the input signal sequence into an output signal whose amplitude is a function of the repetition frequency of the input signal sequence, and an evaluation circuit with at least one threshold value element subject to the action of the output signal and which responds if the output signal amplitude reaches a value corresponding to the dropping below of a predetermined minimum speed or the exceeding of a predetermined maximum speed.

The circuit arrangement according to the invention permits the reliable detection of speeds, which are above or below a predetermined minimum speed or a predetermined maximum speed. A preferred use is the dropping below of a critical minimum speed in a fan drive. Further preferred developments of the invention will be apparent from the subclaims.

For many practical uses, it is particularly advantageous if the evaluation circuit has a predetermined response delay. This makes it possible to eliminate from the detection procedure short duration drops below, or rises above, the speed in question. For example, it is possible to simply prevent a circuit arrangement designed for detecting the dropping below of a minimum speed from undesirably responding at the time of starting.

Preferably, the threshold value element is also provided with a positive or regenerative feedback, which leads to a further increase in the operational reliability, in that a completely satisfactory switching of the threshold value element is ensured.

It is frequently important also for the evaluation circuit to have a latch function, i.e. a storing or locking action. In this way, detected rises above or drops below the speed in question can be stored. For example, it is possible that at the end of the delay time and when the repetition frequency of the input signals has dropped below a predetermined limit value, for the evaluation circuit to lock after emitting an output signal. In case of an undesired speed drop, the locking leads to the emission of an output signal, which can in particular be used as an alarm or switching signal. A particularly reliable protection against the unintentional erasing of the indication is obtained.

If the evaluation circuit is provided with its own power supply, evaluation is still ensured in the case of the failure of the supply voltage of the drive and/or the signal converter.

The input signal sequence can be fundamentally obtained in random manner. In the case of the monitoring of the speed of an electric motor, for example a fan motor, the input of the pulse shaping stage can be connected to a sensor coil, which as an additional winding is located on at least one stator pole of the monitored motor. Another constructionally simple solution consists of connecting a sensor coil with an associated sensor magnet to the input of the pulse shaping stage and past which moves a ferromagnetic part, for example steel fan blades.

BRIEF DESCRIPTION OF THE DRAWINGS

The invention is described in greater detail hereinafter relative to non-limitative embodiments and the attached drawings, wherein:

FIGS. 4 and 5 are supplementary arrangements of the speed monitoring circuit of FIG. 1;

FIG. 6 is a modified embodiment of the evaluation circuit and its connection to the signal converter;

DETAILED DESCRIPTION OF THE PREFERRED EMBODIMENTS

Figure 1:
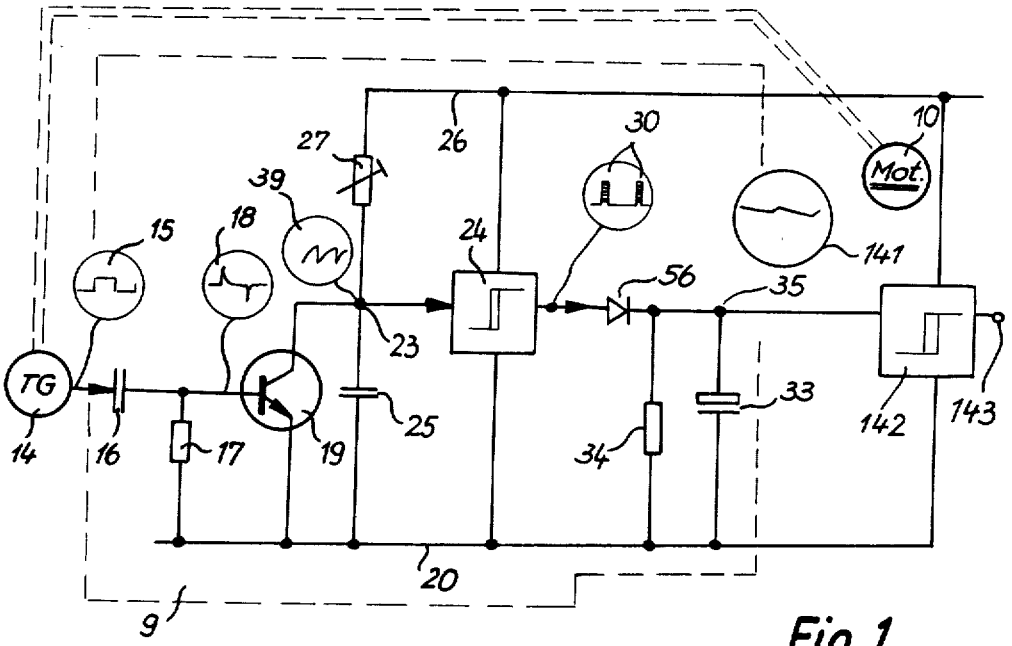
FIG. 1 is a first embodiment of a speed monitoring circuit according to the invention.

FIG. 1 shows a motor 10, which can be, for example, a brushless direct current motor of the type described in detail in U.S. Pat. No. 4,376,261, issued Mar. 8, 1983 which is some how related with an earlier dated U.S. patent application Ser. No. 06/210,409. The motor 10 drives a tachogenerator 14, supplying at its output rectangular pulses 15. The output signal of the tachogenerator 14 is supplied to the input of a signal converter 9, which is designed as a frequency/voltage converter. Tachogenerator can be replaced by any random other detection device for producing an input signal sequence with a repetition frequency which is dependent on the speed of the motor 10. Examples are given hereinafter in conjunction with FIGS. 11 and 12. The signal converter 9 has a differentiating stage comprising a capacitor 16 and a resistor 17, which differentiates rectangular pulses 15 to obtain relatively short needle pulses 18 of which in the present instance only the positive pulses are active. The needle pulses 18 are supplied to the base of a non-discharge transistor 19, whose emitter is connected to a negative line 20, while its collector is connected with a junction 23 and via the latter with the input of a threshold value stage 24. A capacitor 25 is provided between the junction 23 and the negative line 20. A resistor 27, which can be constructed in an adjustable manner, is positioned between a positive line 26 and the junction 23. The resistor 27 forms the charging path for the capacitor 25, which can be discharged across the transistor 19. Output pulses 30 from the threshold value stage 24 are supplied across a diode 56 to an integrator, which has an integrating capacitor 33 and passive discharge means in the form of a resistor 34 connected in parallel thereto. Pulses 30 are integrated by means of the integrating capacitor 33 so that at a junction 35 forming the output of the signal converter 9, a speed-dependent analog signal 141 appears whose amplitude is determined by the frequency and length of pulses 30 and decreases with rising speed.

Figure 2:
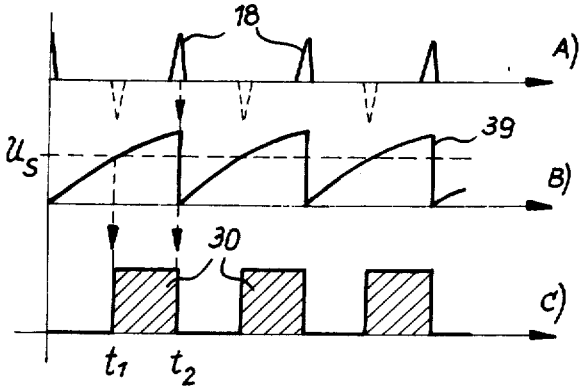
FIGS. 2 and 3 are diagrams illustrating the operation of the signal converter of FIG. 1.
Figure 3:
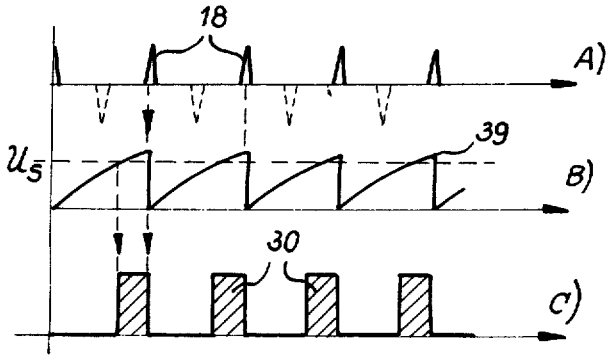

Reference is made to FIGS. 2 and 3 for illustrating the action of the signal converter 9. FIG. 2 diagrammatically shows the circumstances of a relatively low speed and FIG. 3, of a higher speed. The same reference numerals are used as in FIG. 1. At the output of the differentiating stage 16, 17 the needle pulses 18 (FIGS. 2,A and 3,A) appear with a frequency which is proportional to the speed of the motor 10. The positive needle pulses 18 briefly switch the transistor 19 fully on, and this discharges the capacitor 25. The capacitor 25 is continuously charged by means of charging resistor 27 in accordance with an exponential function (naturally some other charging characteristic would also be possible). The charging time constant is significantly greater than the discharging time constant. As a function of how closely the pulses 18 follow one another, a voltage 39 at the capacitor 25 reaches a given level before the capacitor is discharged again. This can be gathered by comparing FIGS. 2,B and 3,B. In FIG. 2, the motor 10 runs slowly and the voltage 39 reaches a relatively high amplitude. In FIG. 3, the motor runs faster, and the amplitude of the voltage 39 is lower. Thus, this amplitude inversely is a measure of the speed of the motor 10.

The threshold value stage 24 is set to a particular threshold voltage $U_s$, which can be seen in FIGS. 2,B and 3,B. If voltage 39 across the capacitor 25 exceeds the value $U_s$, the threshold value element 24 emits an output signal 30 of the predetermined, constant amplitude until the voltage 39 has again dropped below the threshold value $U_s$.

For example, in FIG. 2, the voltage 39 exceeds the threshold value $U_s$ at the time $t_1$ and drops below it again at a time $t_2$. Thus, the charging current pulses 30 are obtained at the output of the threshold value stage 24 which, according to FIG. 2,C are relative long when the speed is low and which, according to FIG. 3,C, become increasingly short with rising speed. The pulses 30 are supplied to integrator 33, 34, where they are integrated. At low speeds, the amplitude of an analog signal 141 is high at junction 35, whereas the amplitude of this signal drops at higher speeds.

The output of the signal converter 9 is connected to the input of a threshold value element 142, used for evaluating the speed-dependent analog signal 141. In the present embodiment, it is assumed that the threshold value element 142 is switched over when the analog signal 141 exceeds a predetermined amplitude, i.e., the speed of the motor 10 drops below a predetermined lower limit value. In such case, a corresponding recognition signal appears at output 143 of the threshold value element 142. In place of this, the circuit design could also be such that the threshold value element 142 switches over if the analog signal 141 drops below a predetermined amplitude, i.e., if the speed of the motor 10 exceeds a predetermined maximum value.

As an explanatory example, it is assumed that the direct current motor 10 has a nominal speed $n_1 = 1000$ rpm and has recognized speeds $n_2 \leqq 600$ rpm. Then the threshold value of the element 142 has only to be corresponingly set in order to bring about the switching over thereof at the critical speed of 600 rpm.

The circuit arrangement according to FIG. 1 shows that if no special precautions are taken, a fault signal ($n_2 - 600$ rpm) also appears during the starting phase of the motor 10. According to FIG. 4, for the purpose of preventing this, a static timing element 146 comprising a resistor 144 and a capacitor 145 and having a following threshold value element 147 can be connected at output 143. The time constant T of the timing element 146 is preferably somewhat greater than the starting time of the motor. For example, it may be chosen to be double the starting time. As a result, at output 148 of the monitoring circuit extended in this way, only drops in the speed are indicated that last longer than the time constant T.

In practice, it may be desirable to store a drop below or a rise above a critical speed. For this purpose, and in accordance with FIG. 5, it is possible to connect to the output 148 of the threshold value element 147, the setting input S of a digital store 151. This can, for example, be a R-S flip-flop with a resetting input 149(R). In such instance, indication takes place at output 150(Q) of the resettable store 151.

FIG. 6 shows a particularly advantageous embodiment of a circuit arrangement that combines the functions of FIGS. 4 and 5. The signal converter 9 is connected upstream of the circuit arrangement of FIG. 6. The negative and positive lines are again indicated at 20 and 26, respectively. The speed-dependent analog signal 141 from the output 35 of the signal converter 9 passes to the base of a pnp-transistor 167, whose collector/emitter path is in series with a resistor 152 and a light-emitting diode of an optoelectronic coupler 153 ensuring potential separation. A coupler 153 has a phototransistor, whose output is connected to an input 169 of an evaluation circuit 168.

The evaluation circuit 168 is provided with its own power supply in the form of a positive line 164 and a negative line 166. Thus, the evaluation circuit 168 advantageously remains in operation, even in the event of a failure of the power supply of the motor 10, which can be the same as that of the signal converter 9. The collector/emitter path of the phototransistor of the coupler 153 is in series with a resistor 154. The input 169 represents the junction between resistor 154 and the collector of the phototransistor of coupler 153. A signal corresponding to the speed-dependent analog signal 141 appears at the input 169 and passes to the positive input of a threshold value element 142 of the embodiment of FIG. 1. The negative input of the threshold value element 155 is connected to a junction 171 between two resistors 159 and 160. These resistors form a voltage divider located between the power supply terminals 164, 166. This voltage divider preferably has a division ratio of 1:2. By means of the series connection of a resistor 156 and two diodes 157 and 158, the output of the threshold value element 155 is connected to the positive line 164. The static timing element, comprising resistors 144, 156 and the capacitor 145, is connected to a junction 170 between the resistor 156 and the anode of the diode 157. A junction 172, between the resistor 144 and the capacitor 145, is connected to the negative input of a further threshold value element 163, whose positive input is connected to the junction 171 of the voltage divider 159, 160. The junction 171 is also connected via a diode 162 to the output of the threshold value element 163, while the junction 172 is connected via a diode 161 to the positive line 163. The output signal of the evaluation circuit 168 appears at the output 150 of the threshold value element 163.

The evaluation circuit 168 with the two threshold value elements 155, 153 constructed as comparators functions as follows. For as long as the motor 10 operates at a speed that is higher than the low critical speed $n_2$ to be detected, the amplitude of the speed-dependent analog signal appearing at the input 169 has a value which is lower than the voltage value of the negative input of the threshold value element 155 determined by voltage divider 159, 160. The output of the threshold value element 155 is low. The capacitor 145 is only charged to a minimum extent, namely, to twice the diode voltage of the diodes 157 or 158. The signal at the negative input of the comparator 163 is lower than the voltage at the positive input of this comparator. A high signal appears at the output 150, and the diodes 161 and 162 are blocked.

As soon as the speed of motor 10 drops to the critical lower speed value $n_2$, the signal at the input 169 leads to the switching over of the threshold value element 155, and the output of the latter becomes high. The capacitor 145 is charged via the resistors 144 and 156. The resistor 156 (the working resistor of the threshold value element 155) is much smaller than the resistor 144 and therefore only participates to a minor extent in the charging time constant T. As soon as the voltage at the junction 172 reaches a value which is above the value of the voltage at the junction 171, the threshold value element 163 is switched over at its negative input. The output 150 of the threshold value element 163 jumps to a low potential. As a result, a recognition signal is supplied at the output 150. By means of the diode 162, the positive input of the comparator 163 is kept low. At the same time, the negative input of the comparator 155 is subject to the action of a low potential from the junction 171. Thus, like the threshold value element 163, the threshold value element 155 is locked, the series connection of the diodes 157, 158 ensuring that there is a somewhat higher potential at the junction 170 (corresponding to twice the value of the diode voltage of the diodes 157 or 158) than at the junction 171 (corresponding to the diode voltage of the diode 162). The speed recognition is consequently reliably stored in this way. The storage formed by the threshold value element 163 can be reset on the switching off of the supply voltage of the evaluation circuit 168 when the capacitor 145 is discharged via the diode 161.

It should be apparent that the discharging of the capacitor 145 for resetting the storage 163 can also be brought about in some other way, for example, by means of an additional discharge transistor. For locking the storage 163 in the recognition position, the diodes 157, 158 can also be replaced by a resistor which, together with the resistor 156, forms a voltage divider which, after switching over threshold value element 163, keeps the junction 170 more positive than the junction 171.

The circuit arrangement according to FIG. 6 makes it possible to realize the junction of FIGS. 4 and 5 with a particularly small number of components. The illustrated arrangement can also be used for detecting the exceeding of a maximum speed value rather than the dropping below of a minimum speed value. It also should be apparent that a plurality of evaluation circuits with different threshold values can be connected at the output of the signal converter 9 to indicate the rising above or the dropping below of several different speed values.

Figure 7:
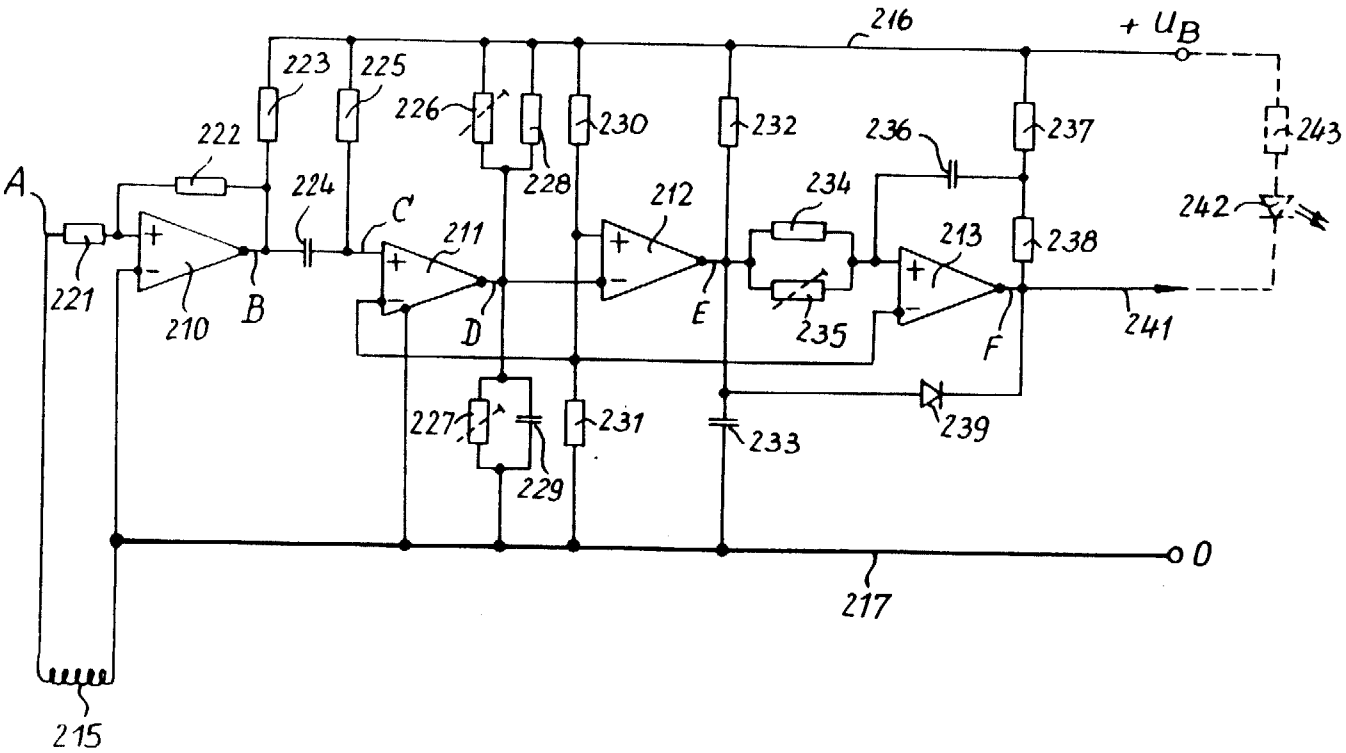
FIG. 7 is a diagram of a further embodiment of a speed monitoring circuit according to the invention.

The modified speed monitoring arrangement according to FIG. 7 has four comparators 210, 211, 212, 213, which appropriately form part of an integrated quadruple comparator circuit (for example, National Semiconductor type 2901N). The first comparator 210 forms a pulse shaping stage to whose input A is connected a sensor coil 215. The comparator 210 is negatively fed back by resistors 221, 222 in order to counteract any oscillating tendency. The output of the comparator 210 is connected via a working resistor 223 and a line 216 to the operating voltage $+U_B$. A differentiating stage comprising a capacitor 224 and a resistor 225 is connected to the output B of the pulse shaping stage formed by the comparator 210. The differentiating stage 224, 225 is followed by a signal converter to which belong the two comparators 211, 212 and which in this case constitutes a retriggerable monostable flip-flop. The inverting inputs of the comparators 211, 214 and the non-inverting input of the comparator 212 are applied by means of a voltage divider formed by resistors 230, 231 to a fixed reference or threshold voltage, which in the present embodiment is appropriately half the operating voltage $+U_B$. A series connection of a resistor 228 and a capacitor 229, with which are connected in parallel adjustable resistors 226, 227, is located between line 216 carrying the positive operating voltage $+U_B$ and an earth line 217. The junction of the resistor 228 and the capacitor 229 is connected with output D of the comparator 211, which is connected to the inverting input of the comparator 212. The output E of the comparator 212 is connected to the junction of a resistor 232 and a capacitor 233, which are in series between the lines 216, 217. Output E of the comparator 212 is also connected via a resistor 234 to the non-inverting input of the comparator 213 forming a threshold value element. An adjustable resistor 235 is connected in parallel to the resistor 234. A series connection of resistors 237, 238 is located between the line 216 and an output F of the comparator 213. The junction between the resistors 237, 238 is connected via a capacitor 236 to the non-inverting input of the comparator 213. A diode 239 is connected between the outputs E and F of the comparators 212, 213. The output of the speed monitoring arrangement is designated 241. Between the output 241 and the line 216 can be connected, for example, a light-emitting diode 242 with a series resistor 243 in a manner indicated by the broken line.

Figure 11:
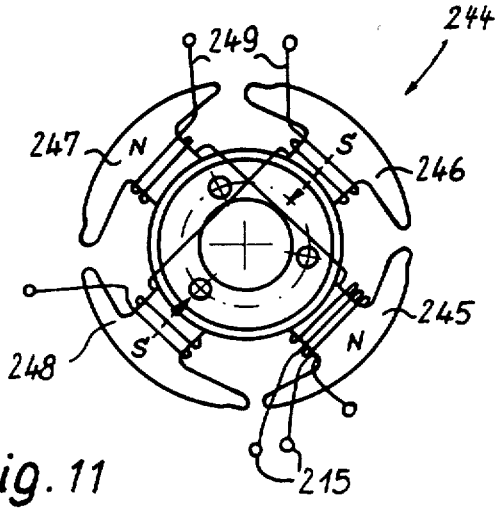
FIG. 11 is a basic diagram of the sensor of a monitored direct current motor with additionally fitted sensor coil.

FIG. 11 diagrammatically shows the stator 244 of a fan drive motor with four distinct poles 245, 246, 247, 248 carrying a stator winding 249. This motor can be, for example, a brushless direct current motor with electronic commutation having a permanent magnetic external or outer rotor. In addition, sensor coil 215 is located on one pole 245.

Figure 8:
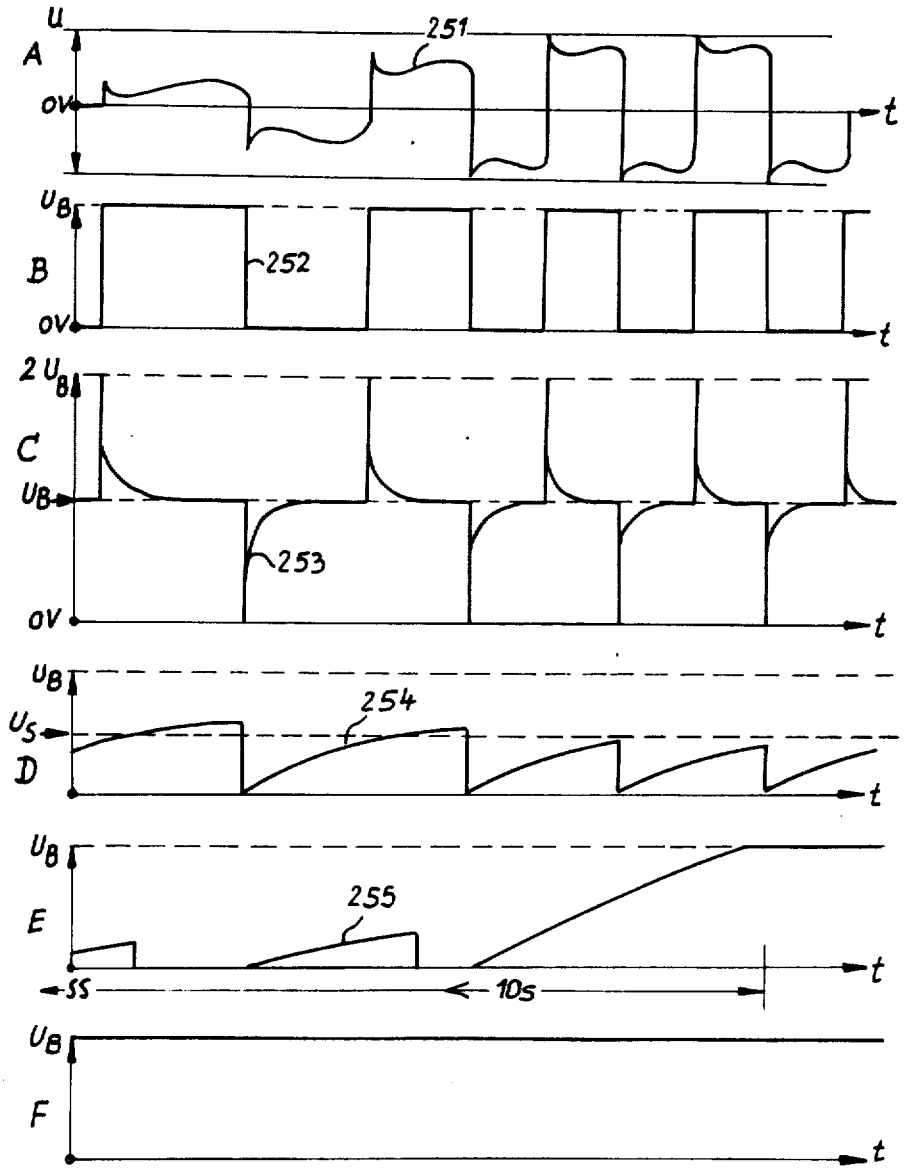
FIG. 8 is a group of pulse diagrams for the arrangement according to FIG. 7 during the starting process.
Figure 9:
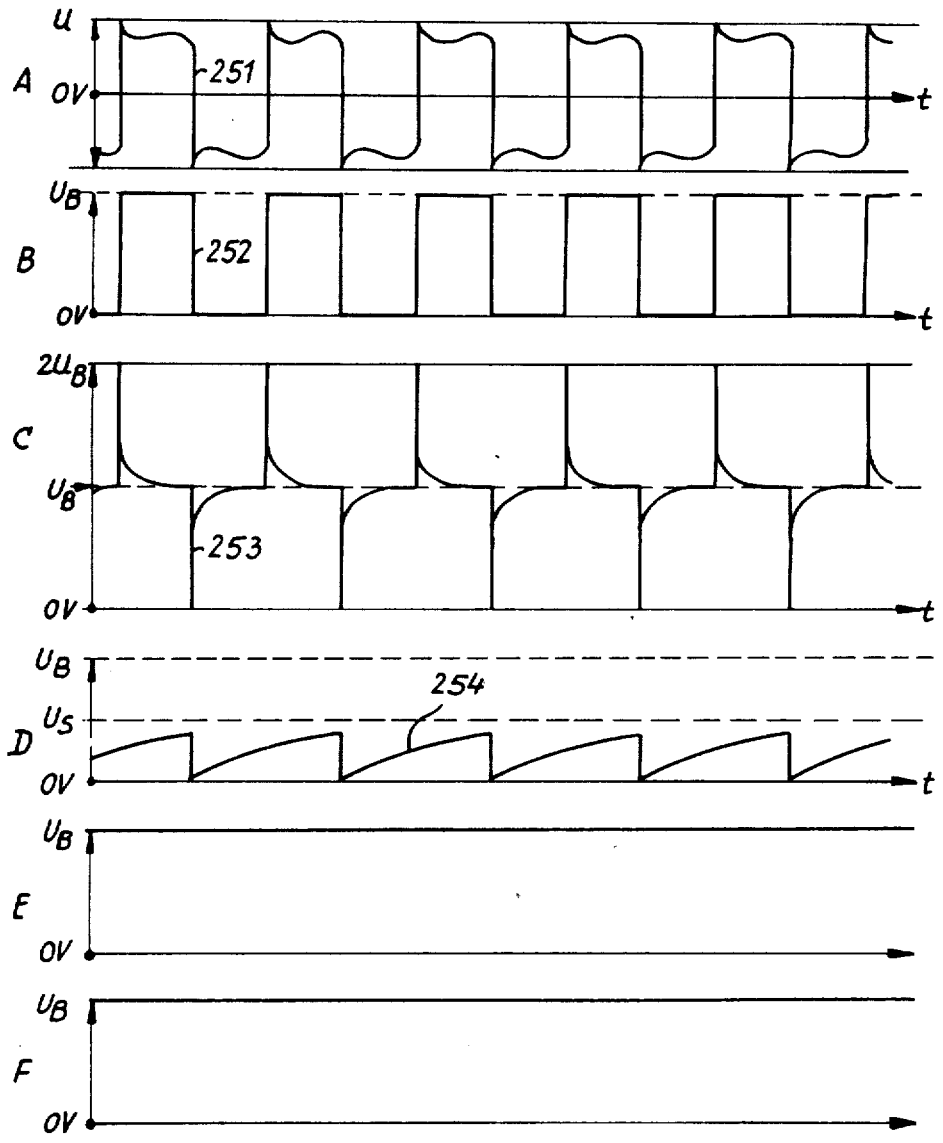
FIG. 9 is a group of pulse diagrams according to FIG. 8 for the monitored arrangement operating at normal speed.
Figure 10:
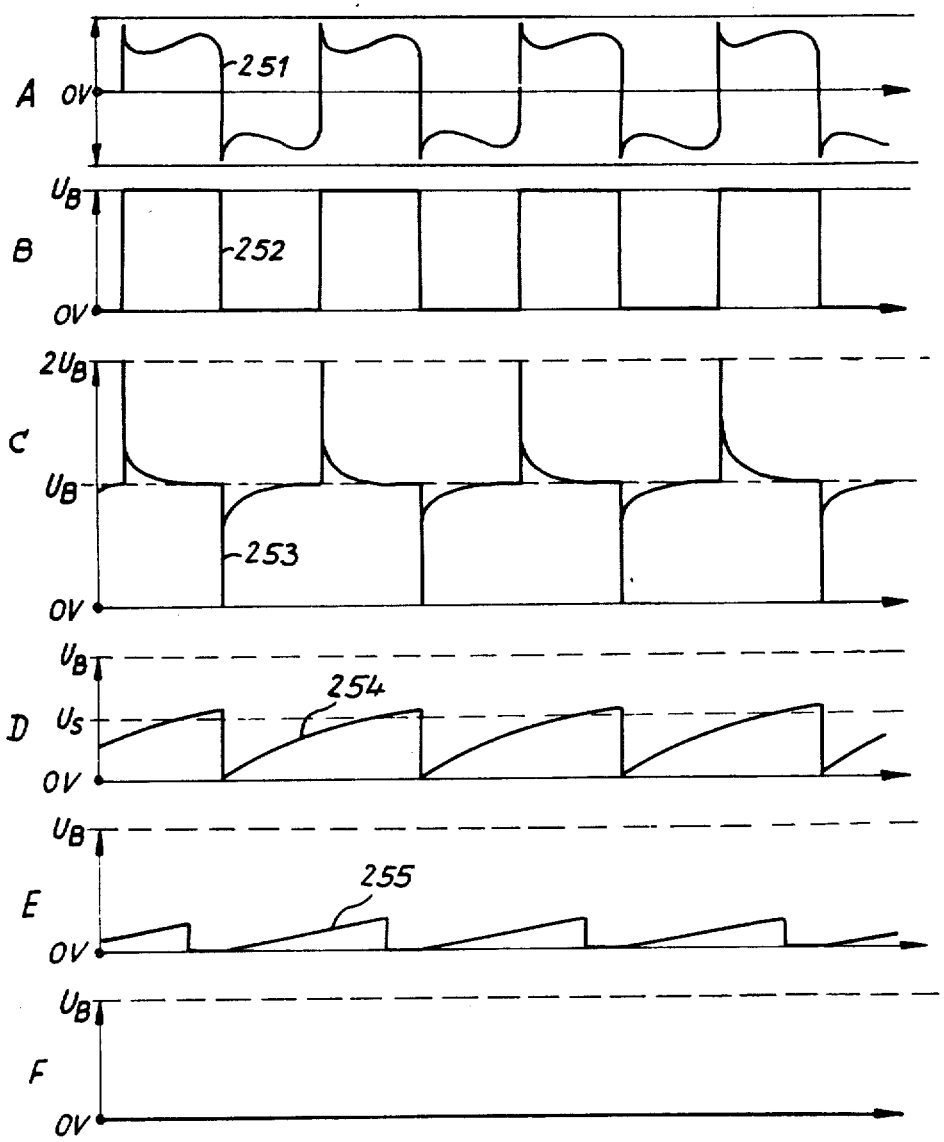
FIG. 10 is a group of pulse diagrams according to FIG. 8 for the monitored arrangement operating at under-speed.

FIGS. 8, 9 and 10 show signals appearing at the points indicated by the same letters of the circuit according to FIG. 7.

If the fan motor is switched on and the rotor starts to accelerate, an input signal sequence 251 according to FIG. 8,A appears at the input A of FIG. 7. The comparator 210 acting as a pulse shaper evaluates the zero passages of the input signal sequence 251, and a rectangular pulse voltage 252 according to FIG. 8,B appears at the output B of the comparator 210. The rectangular pulses 252 are differentiated by a differentiating stage 224, 225 so that a needle pulse train 253 according to FIG. 2,C appears at signal input C of the comparator 211. In the interval between two successive negative pulses 253, the capacitor 229 is charged via the resistor 228 (and optionally 226). In each negative pulse 253, the comparator 211 is switched through to earth at its output D and the capacitor 229 is discharged. The comparator 211 does not respond to the positive needle pulses of the pulse train 253. A sawtooth signal 254 as shown in FIG. 8,D appears at the output D of the comparator 211. The sawtooth voltage 254 is supplied to the inverting input of the comparator 212 and is compared there with the reference voltage $U_B/2$ determined by the resistors 230, 231. If the sawtooth voltage 254 extends the threshold value $U_S=U_B/2$ (FIG. 8,D), the comparator 212 switches through to earth at its output E so that the capacitor 233 charging across the resistor 232 is discharged. Thus, a voltage signal 255 as shown in FIG. 8,E appears at the output E of the comparator 212. As can be seen in FIG. 8, the sawtooth voltage 254 only exceeds the threshold value $U_S$ at low speed. As soon as the speed approaches the normal operating speed corresponding to the right-hand part of FIG. 2, the threshold value $U_S$ is no longer reached at the inverting input of the comparator 212. There is no discharging of the capacitor 233 via the output circuit of the comparator 212. The capacitor 233 changes to the full voltage $+U_B$ (FIG. 8,E).

During the starting process illustrated in FIG. 8 and unless special precautions are taken, an alarm or switching signal will be initiated at the output 241 of the speed monitoring arrangement as soon as the sawtooth signal 254 exceeds the threshold value $U_S$ (left-hand half of FIG. 8,D) and the capacitor 233 is discharged, or before capacitor 233 had charged to $+U_B$, respectively. A delay or timing element 234, 235, 236 prevents such an undesired response during starting, because by means of a capacitor 236 the non-inverting input of the comparator 213 is initially held at a voltage which is above threshold voltage $U_S$. In other words, the timing element 234, 235, 236 suppresses for a predetermined time of, for example, 10 seconds, adjustable by means of an adjustable resistor 235, the control of the comparator 213 by the comparator 212. The threshold value element defined by the comparator 213 does not switch through during this starting phase. No alarm signal appears at the output F of the comparator 213, i.e., the voltage $+U_B$ appears there in an uninterrupted manner (FIG. 8,F).

When running at normal speed, the signal patterns shown in FIG. 9 occur. As can be gathered from FIG. 9,D, at no time does the sawtooth voltage 254 exceed the threshold voltage $U_S$, so that the comparator 212 is not switched through. The capacitor 233 remains continuously charged to voltage $+U_B$. The output F of the threshold value element 213, like the output E of the comparator 212, remains at $+U_B$, and no signal appears at the output 241.

However, if the monitored speed drops below the predetermined minimum value (FIG. 10), the voltage at the output of the comparator 211 intermittently rises above the threshold value $U_S$(FIG. 10,D). The comparator 212 is then switched through in order to discharge the capacitor 233 (FIG. 10,E). The input signal at the non-inverting input of the comparator 213 drops below the threshold value, and the comparator 213 is switched over. The output F of the comparator is drawn to earth potential by a final stage (not shown), which may be, for example, in the form of a transistor of the comparator 213. An alarm is given (FIG. 10,F). The negative jump at the output F is momentarily transmitted via the capacitor 236 to the non-inverting input of the comparator 213. A positive feedback is achieved in this way and ensures the reliable switching over of the comparator 213. If the potential at the output F drops, the output of the comparator 212 is drawn down to earth by means of a diode 239 so that a resistor 232 can no longer charge the capacitor 233, which ensures the latch function. The threshold value switch formed by the comparator 213 is locked in the alarm state. It remains locked in this position until the supply voltage is switched off by external action.

Figure 12:
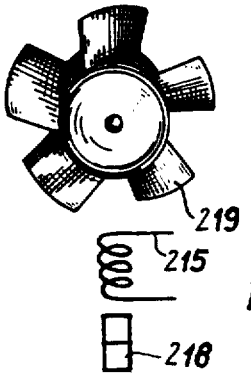
FIG. 12 diagrammatically shows a modified embodiment of the sensor arrangement.

FIG. 12 diagrammatically shows a modified embodiment for obtaining an input signal sequence (corresponding to FIGS. 8,A,9,A and 10,A). A sensor magnet 218 is associated with a sensor coil 215 and a ferromagnetic component 219, for example the sheet steel fan blade, moves past the combination of the sensor coil 215 and the sensor magnet 218 with the timing of the speed which is to be monitored.

It should be apparent that the invention is not limited to the manner of obtaining the input signal sequence indicated in FIGS. 1, 11 and 12. The input signal sequence can be fundamentally a signal derived in a random manner whose frequency is dependent on the speed to be monitored.

While the invention has been described in connection with a preferred embodiment and certain alternatives, other alternatives, modifications, and variations may be apparent to those skilled in the art in view of the foregoing description. Accordingly, it is intended to embrace all such alternatives, modifications, and variations as fall within the spirit and scope of the appended claims.

What is claimed is:

1. Circuit arrangement for monitoring the speed of a drive motor, comprising detection means for producing an input signal sequence having a speed-dependent repetition frequency, a signal converter for converting the input signal sequence into an output signal the amplitude of which is a function of the repetition frequency of the input signal sequence, and an evaluation circuit having at least one threshold value means responsive to the output signal for providing an alarm signal when the amplitude of the output signal reaches a value corresponding to a drop of the motor speed below a predetermined minimum speed, said evaluation circuit having a predetermined response delay exceeding the acceleration time of the motor to prevent provision of said alarm signal during motor start-up.

2. Circuit arrangement for monitoring the speed of a drive motor, comprising detection means for producing an input signal sequence having a speed-dependent repetition frequency, a signal converter for converting the input signal sequence into an output signal the amplitude of which is a function of the repetition frequency of said input signal sequence, and an evaluation circuit having at least one threshold value means responsive to said output signal for providing an alarm signal when the amplitude of said output signal reaches a value corresponding to an increase of the motor speed above a predetermined maximum speed, said evaluation circuit having a predetermined delay exceeding the acceleration time of said motor to prevent the provision of said alarm signal during starting of said motor.

3. A circuit arrangement according to claim 1 or 2, wherein the detection means comprises a pulse shaping stage for producing a rectangular pulse train defining said input signal sequence.

4. A circuit arrangement according to claim 2, wherein the signal converter includes a differentiating stage coupled between the detection means and the output of the signal converter.

5. A circuit arrangement according to claim 4, wherein the signal converter is provided with a first charge storage chargeable through a charging path and with switching means coupled to said charge storage for discharging said charge storage, said switching means being triggered by output signals from the differentiating stage.

6. A circuit arrangement according to claim 5, wherein the charging time constant of the charge storage is a multiple of the discharging time constant thereof.

7. A circuit arrangement according to claim 6, wherein the charge storage is connected in the input circuit of a first threshold value stage of said signal converter.

8. A circuit arrangement according to claim 7, wherein the first threshold value stage is designed to supply output pulses of constant amplitude, the pulse width of said output pulses being a function of the length of time when the voltage across said first charge storage exceeds a predetermined threshold value, and wherein said signal converter further comprises integrator means for integrating the output pulses of the first threshold value stage.

9. A circuit arrangement according to claim 7, wherein a second charge storage chargeable through a further charging path from a d.c. voltage source is discharged by means of the first threshold value stage during the time intervals when the voltage across the first charge storage exceeds a predetermined threshold value.

10. A circuit arrangement according to claim 1 or 2, wherein an RC delay circuit and further threshold value means connected to the output thereof are connected to the output of said at least one threshold value means for suppressing the detection of brief drops below a predetermined speed to be monitored.

11. A circuit arrangement according to claim 1 or 2, further comprising an RC element with resistance means connected between the output of the signal converter and the signal input of the threshold value means and a capacitor connected on one terminal with the signal input of the threshold value means, whereby only after said capacitor connected on one terminal with the signal input has been charged to a predetermined value is the threshold value means responsive to an input signal thereto.

12. A circuit arrangement according to claim 1 or 2, wherein the threshold value means is provided with positive feedback from the output thereof.

13. A circuit arrangement according to claim 11 wherein the other terminal of the capacitor is subject to the action of part of the output signal of the threshold value means.

14. A circuit arrangement according to claim 1 or 2, wherein the evaluation circuit has a latch function.

15. A circuit arrangement according to claim 14, wherein a storage means is provided for executing said latch function by storing said alarm signal.

16. A circuit arrangement according to claim 15, wherein said storage means comprises a resettable digital storage device.

17. A circuit arrangement according to claim 16, wherein the resettable digital storage device has a comparator with feed-back means by which the comparator is locked in the set state following setting and is adapted to be unlocked by external action only.

18. A circuit arrangement according to claim 17, wherein the feed-back means of said digital storage device is connected to an input of the threshold value means for also locking said threshold value means in response to said alarm signal.

19. A circuit arrangement according to claim 15, wherein the threshold value means is itself constructed as the storage means.

20. A circuit arrangement according to claim 19, wherein said threshold value means has associated thereto locking means which can only be unlocked by external action.

21. A circuit arrangement according to claim 20, wherein a diode is connected between the outputs of the signal converter and the threshold value means.

22. A circuit arrangement according to claim 1 or 2, wherein its power supply is insulated from the power supply of the motor.

23. A circuit arrangement according to claim 22, wherein the evaluation circuit is connected to the output of the signal converter via an optoelectronic coupler.

24. A circuit arrangement according to claim 3, wherein the active components of the pulse shaping stage, the signal converter and the evaluation circuit are formed by an integrated quadruple comparator circuit.

25. A circuit arrangement according to claim 1 or 2, wherein the detection device has a sensor coil which is positioned as an additional winding on at least one stator pole of an electric motor to be monitored.

26. A circuit arrangement according to claim 1 or 2, wherein the detection device has a sensor coil with an associated sensor magnet disposed such that a ferromagnetic part of the motor to be monitored moves past it.

27. A circuit arrangement for speed monitoring, particularly for fan drives, comprising detection means for producing an input signal sequence having a speed-dependent repetition frequency, a signal converter for converting the input signal sequence into an output signal the amplitude of which is a function of the repetition frequency of said input signal sequence, and an evaluation circuit having a predetermined response delay, said evaluation circuit including at least one threshold value means which is responsive to said output signal and which responds if the amplitude of said output signal reaches a value corresponding to a drop of the monitored speed below a predetermined minimum speed, and an RC circuit including resistance means connected between the output of the signal converter and the signal input of said threshold value means and a capacitor, one terminal of said capacitor being connected with the signal input of said threshold value means and the other terminal of said capacitor being subject to the action of part of the output signal of said threshold value means, whereby said threshold value means is prevented from responding to an input signal applied thereto until the voltage across said capacitor exceeds a predetermined value thereby to provide for said response delay.

28. A circuit arrangement for speed monitoring, particularly for fan drives, comprising detection means for producing an input signal sequence having a speed-dependent repetition frequency, a signal converter for converting the input signal sequence into an output signal the amplitude of which is a function of the repetition frequency of said input signal sequence, and an evaluation circuit having at least one threshold value means which is responsive to said output signal and which responds by providing a recognition signal if the amplitude of said output signal reaches a value corresponding to a drop below a predetermined minimum speed, said evaluation circuit having a latch function for said recognition signal.

29. A circuit arrangement for speed monitoring, particularly for fan drives, comprising detection means for producing an input signal sequence having a speed-dependent repetition frequency, a signal converter for converting the input signal sequence into an output signal the amplitude of which is a function of the repetition frequency of said input signal sequence, and an evaluation circuit including at least one threshold value means which is responsive to said output signal and which responds if the amplitude of said output signal reaches a value corresponding to a drop of the monitored speed below a predetermined minimum speed, said evaluation circuit being provided with its own power supply.

30. A circuit arrangement for speed monitoring, particularly for fan drives, comprising detection means for producing an input signal sequence having a speed-dependent repetition frequency, a signal converter for converting the input signal sequence into an output signal the amplitude of which is a function of the repetition frequency of said input signal sequence, and an evaluation circuit having a predetermined response delay, said evaluation circuit including at least one threshold value means which is responsive to said output signal and which responds if the amplitude of said output signal reaches a value corresponding to an increase of the monitored speed over a predetermined maximum speed, and an RC circuit including resistance means connected between the output of the signal converter and the signal input of said threshold value means and a capacitor, one terminal of said capacitor being connected with the signal input of said threshold value means and the other terminal of said capacitor being subject to the action of part of the output signal of said threshold value means, whereby said threshold value means is prevented from responding to an input signal applied thereto until the voltage across said capacitor exceeds a predetermined value thereby to provide for said response delay.

31. A circuit arrangement for speed monitoring, particularly for fan drives, comprising detection means for producing an input signal sequence having a speed-dependent repetition frequency, a signal converter for converting the input signal sequence into an output signal the amplitude of which is a function of the repetition frequency of said input signal sequence, and an evaluation circuit having at least one threshold value means which is responsive to said output signal and which responds by providing a recognition signal if the amplitude of said output signal reaches a value corresponding to an increase over a predetermined maximum speed, said evaluation circuit having a latch function for said recognition signal.

32. A circuit arrangement for speed monitoring, particularly for fan drives, comprising detection means for producing an input signal sequence having a speed-dependent repetition frequency, a signal converter for converting the input signal sequence into an output signal the amplitude of which is a function of the repetition frequency of said input signal sequence, and an evaluation circuit including at least one threshold value means which is responsive to said output signal and which responds if the amplitude of said output signal reaches a value corresponding to an increase of the monitored speed over a predetermined maximum speed, said evaluation circuit being provided with its own power supply.

*33. Circuit arrangement for monitoring the speed of a drive motor, comprising detection means for producing an input signal sequence having a speed-dependent repetition frequency, a signal converter for converting the input signal sequence into an output signal which is a function of the repetition frequency of the input signal sequence, and an evaluation circuit having means responsive to the output signal for providing an alarm signal when the output signal corresponds to a drop of the motor speed below a predetermined minimum speed, said evaluation circuit having a predetermined response delay exceeding the acceleration time of the motor to prevent provision of said alarm signal during motor start-up.*

*34. Circuit arrangement for monitoring the speed of a drive motor, comprising detection means for producing an input signal sequence having a speed-dependent repetition frequency, a signal converter for converting the input signal sequence into an output signal which is a function of the repetition frequency of said input signal sequence, and an evaluation circuit having means responsive to said output signal for providing an alarm signal when said output signal corresponds to an increase of the motor speed above a predetermined maximum speed, said evaluation circuit having a predetermined delay exceeding the acceleration time of said motor to prevent the provision of said alarm signal during starting of said motor.*

* * * * *

UNITED STATES PATENT AND TRADEMARK OFFICE

CERTIFICATE OF CORRECTION

PATENT NO. : RE 33,167

DATED : February 20, 1990

INVENTOR(S) : Moosman et al.

It is certified that error appears in the above-identified patent and that said Letters Patent is hereby corrected as shown below:

Column 2, line 60, change "some how" to --somehow--.

Column 3, line 59, change "the" to --a--.

Column 3, line 62, change "relative" to --relatively--.

Column 7, line 46, change "changes" to --charges--.

Signed and Sealed this

Twelfth Day of March, 1991

*Attest:*

HARRY F. MANBECK, JR.

*Attesting Officer*

*Commissioner of Patents and Trademarks*